United States Patent [19]
Danielson

[11] 3,763,945

[45] Oct. 9, 1973

[54] AUTOMOTIVE VEHICLE
[76] Inventor: Oscar L. Danielson, 1845 Nelson Rd., Raton, N. Mex.
[22] Filed: July 15, 1971
[21] Appl. No.: 162,913

[52] U.S. Cl............................... 180/6.66, 180/74
[51] Int. Cl............................................ B62d 11/06
[58] Field of Search.................. 180/6.2, 6.66, 6.48, 180/74; 74/202

[56] References Cited
UNITED STATES PATENTS
| | | | |
|---|---|---|---|
| 381,215 | 4/1888 | Collett | 74/202 X |
| 1,282,329 | 10/1918 | Turner | 180/6.2 UX |
| 2,519,749 | 8/1950 | Edwards | 180/6.2 |
| 2,604,747 | 7/1952 | Bash | 180/74 X |

FOREIGN PATENTS OR APPLICATIONS
604,139  4/1960  Italy................................... 180/74

Primary Examiner—Leo Friaglia
Assistant Examiner—John A. Pekar
Attorney—Ely Silverman

[57] ABSTRACT

Highly maneuverable and sturdy automotive vehicle with movable wheel drive means that permits selective joint or separate actuation of parallel drive and steering wheels, each rotatably supported on an integral shell and frame structure of great dimensional stability and strength.

8 Claims, 16 Drawing Figures

OSCAR L. DANIELSON
INVENTOR.

BY

*Ely Silverman*

ATTORNEY

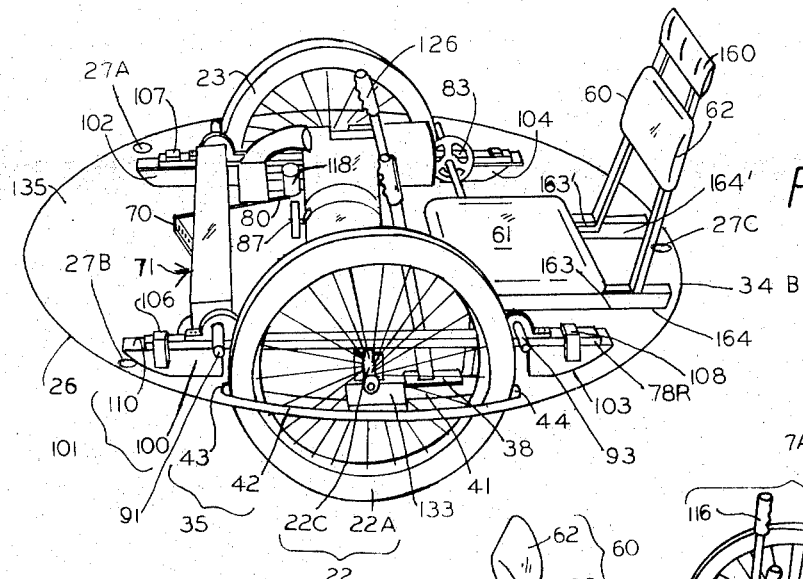
FIG. 4
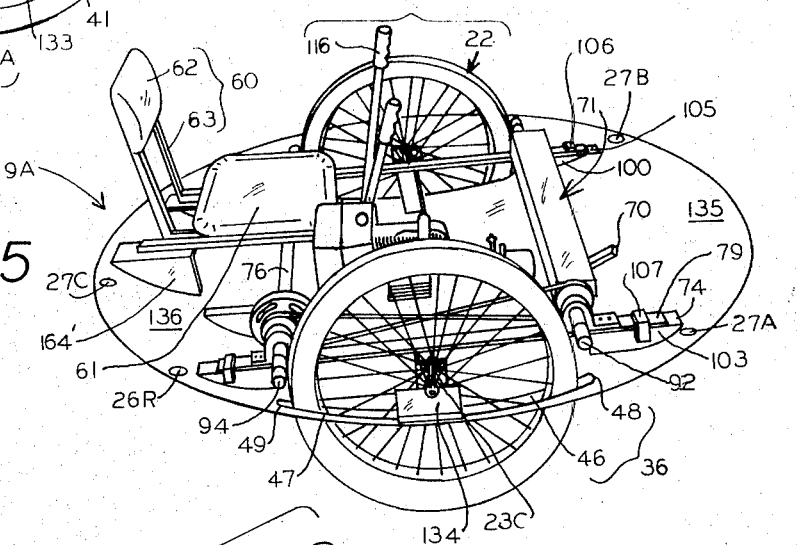
FIG. 5
FIG. 6
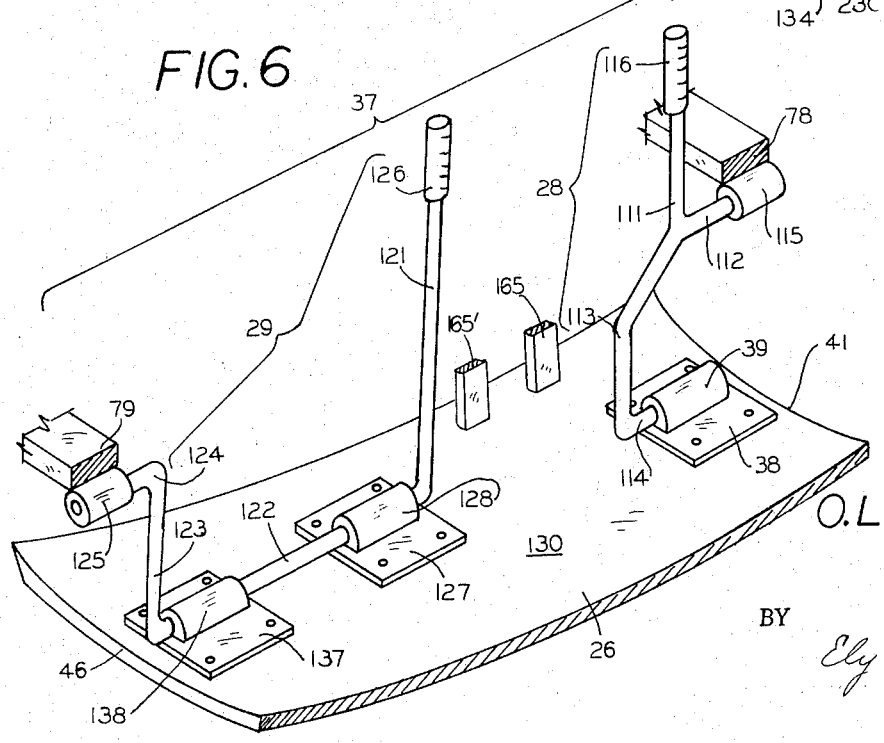
O.L. DANIELSON
INVENTOR.
BY
Ely Silverman
ATTORNEY

PATENTED OCT 9 1973 3,763,945

OSCAR L. DANIELSON
INVENTOR.

BY
Ely Silverman
ATTORNEY

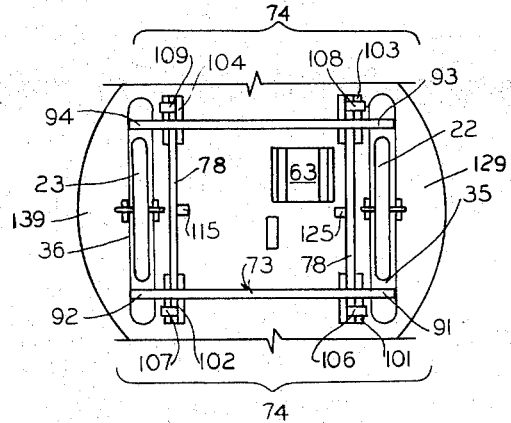
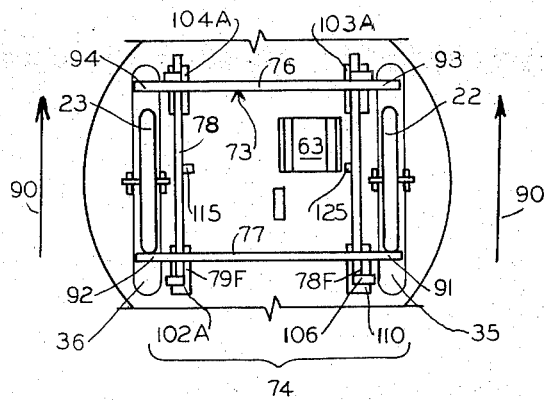
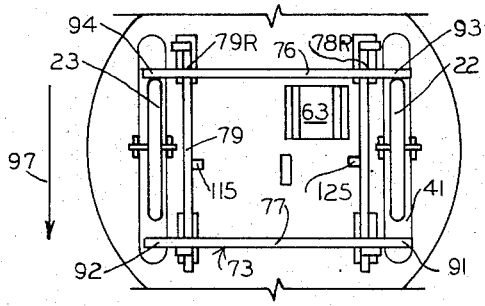
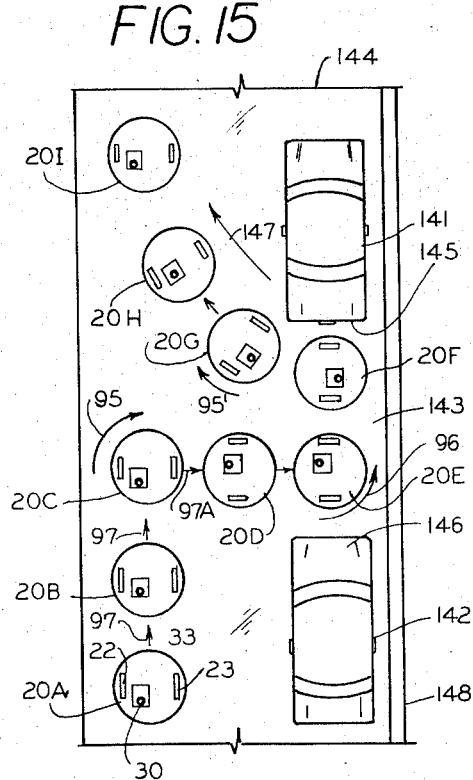
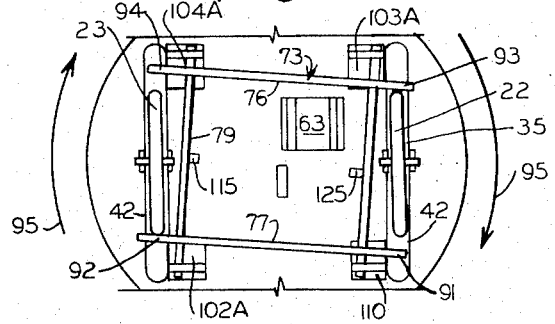
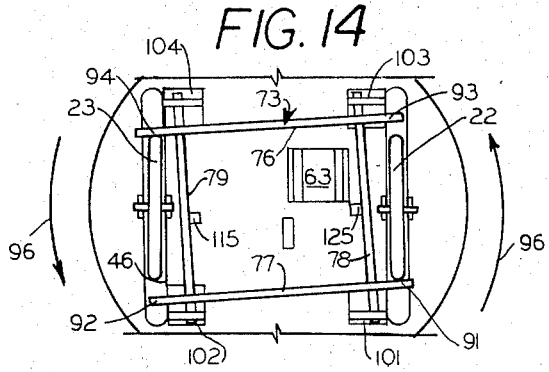

3,763,945

AUTOMOTIVE VEHICLE

BACKGROUND OF THE INVENTION

1. Field of the Invention

The field of art to which this invention pertains is land motor vehicles having three supporting wheels and wherein two parallel wheels are driven.

2. Description of the Prior Art

Conventional automotive vehicles require substantial time as well as difficult maneuvering to park in usual parallel parking spaces and require wide and long paths for turning, especially for 180° turns. These impairments interfere with traffic of other adjacent vehicles, consume time of driver, require additional area for automotive traffic and limit the utility of such vehicles. Selective steering drives (as in U. S. Pat. No. 2,376,419) are expensive to construct and not amenable to delicate control. According to this invention an automotive vehicle of high maneuverability for urban parking and use in industrial plant travel and on campuses is provided because of light yet strong construction it has low horsepower requirement yet not only provides adequate speeds for urban, campus and industrial use but also has a small undesirable exhaust emission and is amenable to incorporation and use of rechargeable electric battery power source and has no mechanical requirements for steering or brake adjustment for adequate braking and steering operation.

SUMMARY OF THE INVENTION

An extremely rigid shell and frame structure, formed of a sturdy integral curved plate so that portions thereof reinforce each other, mechanically circumscribes and so protects as well as supports a pair of driving and steering wheels in a dimensionally stable relation to a fixed platform assembly; wheel driving means are movably located on the platform assembly to selectively not contact or to selectively actuate, for forward or rearward motion, either or both such drive wheels by a simple yet delicate steering and braking control means of this vehicle apparatus.

The resulting cooperation of an extremely strong yet light dimensionally stable shell and frame structure and well protected large wheels and accurate yet flexible drive control provides readily controlled and reliable steering and braking operation. The vehicle apparatus is particularly useful in crowded traffic conditions of present urban areas because of its ready ability to be rapidly parked and stored as well as maneuvered.

BRIEF DESCRIPTION OF THE DRAWINGS:

FIG. 4 is a top left side oblique pictorial view of the vehicle apparatus 20 of FIG. 1 with top shell 25 removed to show structures adjacent left wheel 22 with arms 28 and 29 in their neutral position and, also, a modification of the seat structure.

FIG. 5 is a top right oblique pictorial view of the vehicle apparatus 20 of FIG. 1 with top shell 25 removed to show structure adjacent to right wheel 23 at the neutral position of arms 28 and 29.

FIG. 6 is a diagrammatic perspective view of the components of the steering assembly 37 of vehicle apparatus 20.

FIGS. 10 through 14 are diagrammatic top or plan view representations of the positions of the drive wheel frame 73 relative to wheels 22 and 23, (with top shell 25, motor 72 and pulley train 81-86 removed) for different types of motion of vehicle apparatus 20;

FIG. 10 diagrammatically shows the relation of the wheel drive frame 73 to the wheels 22 and 23 in the neutral or non-driving position of shafts 76 and 77 of frame 73 relative to wheels 22 and 23;

FIG. 11 diagrammatically shows the relation of parts of frame 73 relative to wheels 22 and 23 on position of the wheel drive frame 73 for rearward motion of the vehicle apparatus 20;

FIG. 12 diagrammatically shows the relations of parts of the wheel drive frame 73 to the wheels 22 and 23 on position of the wheel drive frame 73 for forward motion of the vehicle apparatus 20;

FIG. 13 diagrammatically shows the relations of parts of the wheel drive frame 73 to the wheels 22 and 23 on position of the wheel drive frame 73 for clockwise rotation or rightward turning of the vehicle apparatus 20 about the vertical axis which is the axis of symmetry of the circular edge 34B of shell 26. In this diagrammatic figure and FIG. 14 the fixed frame platforms 101, 102, 103 and 104 are shown wider than in FIGS. 10, 11 and 12 for illustrative purposes.

FIG. 14 diagrammatically shows the relations of parts of the wheel drive frame 73 to the wheels 22 and 23 on position of the wheel drive frame 73 for counterclockwise rotation or leftward turning of the vehicle apparatus 20 about the vertical axis which is the axis of symmetry of the circular edge 348 of shell 26. In this diagrammatic figure and FIG. 14 the fixed frame platforms 101, 102, 103 and 104 are shown wider than in FIGS. 10, 11 and 12 for illustrative purposes.

FIG. 15 diagrammatically illustrates the typical paths of travel of a vehicle apparatus 20 during its entry into and its departure from a parking place for automobiles.

Figure 1:
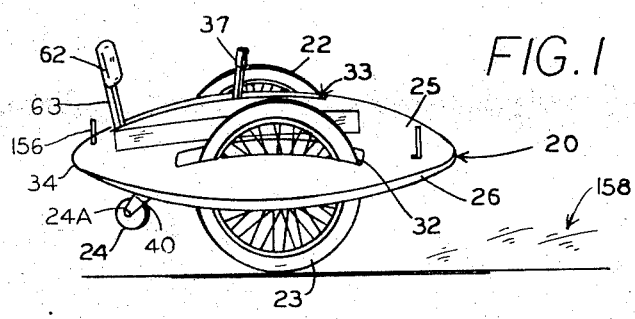
FIG. 1 is a top and right side oblique pictorial view of the vehicle apparatus 20 with roof structure in its contracted position.

Dimensions of the preferred embodiment, referring to the drawings, are set out in Table I.

DEFINITIONS

Figure 8:
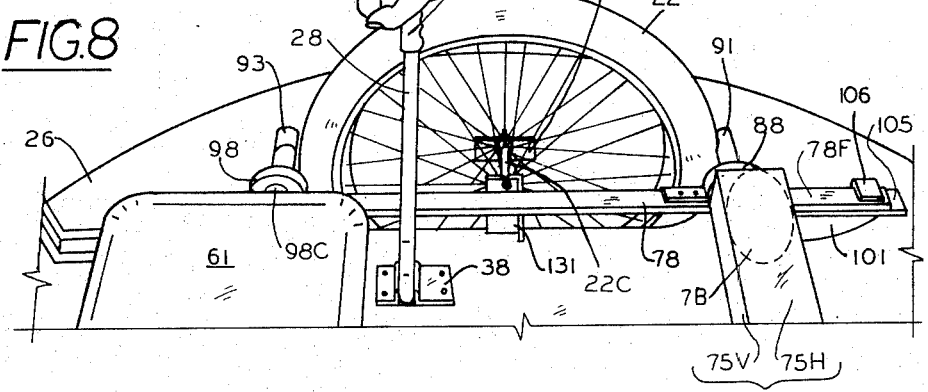
FIG. 8 is a pictorial view corresponding to view in FIG. 7 but with left control assembly arm 28 and related parts shown in zone 7A of FIG. 5 after movement of arm 28 to its retracted or rearward position. Portion 7B of FIG. 8 is shown broken away in FIG. 7.
Figure 9:
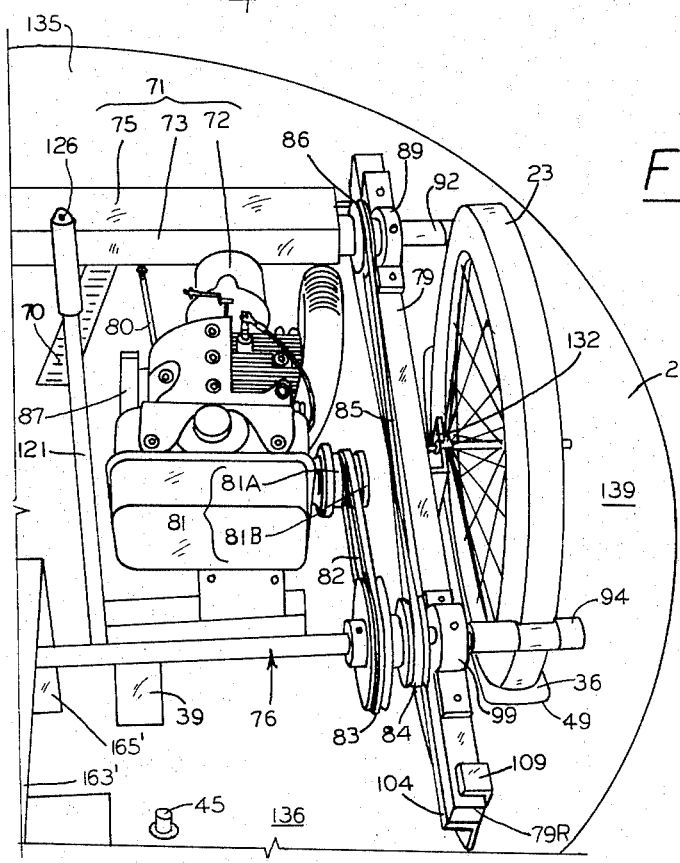
FIG. 9 is a pictorial top and rear oblique view along direction 9A of FIG. 5, with handle 126 of right control arm 29 in its advanced or forward position.

By "driving contact" is meant mechanical contact between two members, as shaft end 91 and wheel 22 as pictorially illustrated in FIG. 8 and diagrammatically shown in FIGS. 11 and 14 and as shaft end 93 and wheel 22, as illustrated in FIG. 9 and diagrammatically shown in FIGS. 12 and 13, wherein there is not only physical contact between the members, as 91 and 22 but also sufficiently firm contact to develop an engaging force therebetween so that the driving member, as 91 and 92 will mechanically engage with and cause the other, or driven member, as 22, to rotate about its axle. Mere touching contact between the driving and driven members is not enough to cause the driving member to operatively engage the driven member; the force on driving contact is, however, insufficient to bring the driving and driven members together so forcefully that the power applied to the driving member is insufficient to turn the driven member as can occur when the driven member, as the wheel 22 has a compressible tire, as 22A on its periphery.

DESCRIPTION OF THE PREFERRED EMBODIMENT

Figure 2:
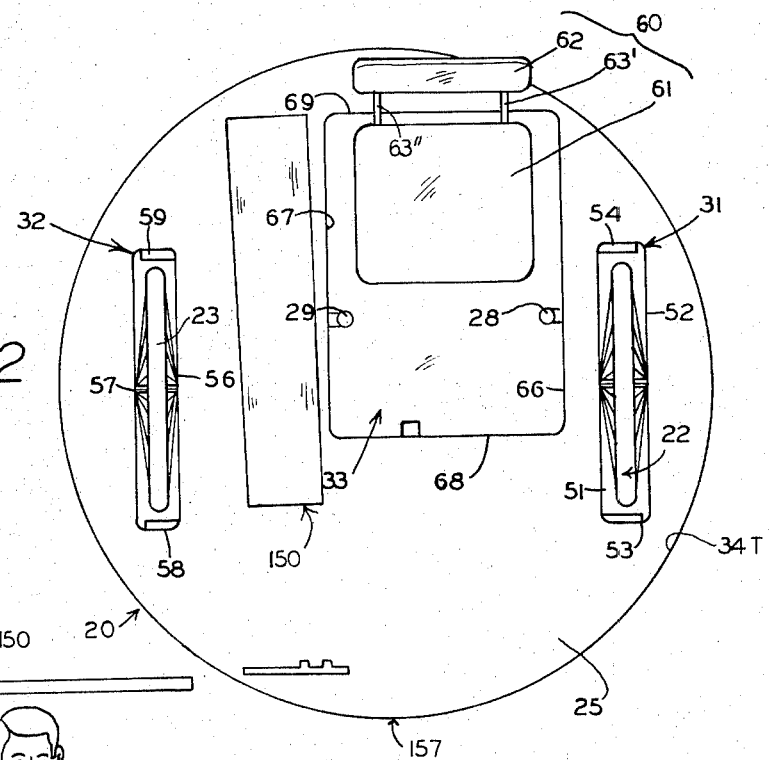
FIG. 2 is a top plan pictorial view of the vehicle apparatus of FIG. 1.
Figure 3:
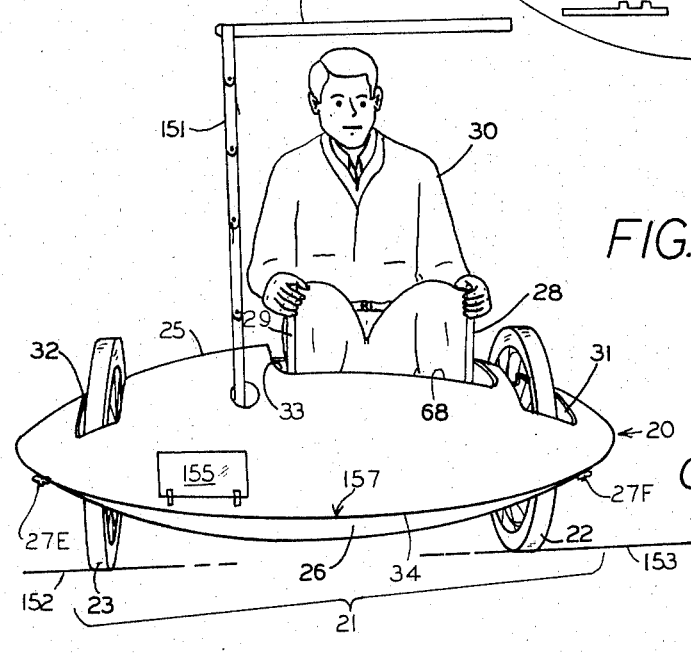
FIG. 3 is a front pictorial view of the vehicle apparatus 20 of FIG. 1 with operator 30 therein and roof structure in its extended position.

The assembled operative apparatus 20 according to this invention shown in FIGS. 1-3 comprises a shell and wheel assembly 21 in operative combination with a drive unit 71 (as shown in FIGS. 4, 5 and 9). The two units 71 and 21 cooperate with each other, the drive unit serving to maneuver and move the shell unit and the shell unit providing support for parts of the drive unit.

The shell and wheel unit 21 comprises wheels 22 and 23 and a rigid curved upper shell 25 and a rigid lower shell 26. The upper and lower shells are firmly yet releasably connected to each other and have a circular edge 34 as seen from the top, as shown in FIG. 2. The upper and lower shells are each shaped in the form of an axially symmetrical segment of a hollow sphere, cut off by a horizontal plane parallel to a diameter of such sphere, which horizontal plane intersects the spherical surfaces at a common lateral circular outer edge 34. The upper and lower segments 25 and 26 are both axially symmetrical about the same vertical central axis of symmetry. Shells 25 and 26 have the same size curvature and shape. The upper shell 25 is convex upward; the lower shell 26 is convex downward. Shells 25 and 26 are mirror images of each other.

The wall of shell 25 and the wall of shell 26 are each formed of three-sixteenths inches thick steel with smooth outer and inner surfaces.

The upper shell 25 is provided on its left side with a longitudinally elongated left wheel hole 31 for a left wheel 22 and on its right side with a longitudinally elongated right shell hole 32 for the right wheel 23. A rectangular seat hole 33 is provided for location of the driver 30 between holes 31 and 32 and spaced therefrom.

The seat hole 33 is bounded by a left longitudinally extending side edge 66, a right longitudinally extending side edge 67 and transversely extending front edge 68 and rear edge 69.

The bottom shell 26 has on its left side a longitudinally extending bottom shell left wheel hole 35 for the left wheel 22 and on the right side thereof shell 26 has a longitudinally elongated bottom right wheel shell hole for the right wheel 23.

The shell 26 is an integral unit and is, for purposes of description only, considered as composed of; a central upwardly concave portion, 130, between the wheel openings 35 and 36; a front lower shell portion 135 in front of the openings 35 and 36, a rear lower shell portion 136, to the rear of openings 35 and 36; a left lower shell lateral portion 129 and a right lower shell portion 139, all bounded by the lateral or outer circular edge 34B which edge is the same size and shape as edge 34T of shell 25.

The bottom left shell wheel hole 35 is bounded by a right central edge 41, a left lateral edge 42, a front edge 43 and a rear edge 44. The bottom shell right wheel hole 36 has a left central edge 46, a right lateral edge 47, a front edge 48 and a rear edge 49. Edges 41 and 42 are parallel to each other and extend in flat vertical planes, except at their front and rear ends. Edges 43 and 44 are smoothly rounded and join the ends of edges 41 and 42. Holes 35 and 36 have identical size and shape.

The top left shell wheel hole 31 is bounded by a right central edge 51, a left lateral edge 52, a front edge 53 and a rear edge 54. The top shell right wheel hole has a left edge 56, and a right edge 57, a front edge 58 and a rear edge 59. Edges 51 and 52 are parallel to each other and extend in flat vertical planes, except at their front and rear ends: edges 53 and 54 are rounded and join the ends of edges 51 and 52. Holes 31 and 32 are mirror image identical in size and shape and position in shell 25. Holes 35 and 36 are mirror image identical in size and shape and position in shell 26. Holes 35 and 36 are located above hole 31 and 32, respectively.

Left wheel 22 and the right wheel 23 are firmly yet rotatably supported on brackets which brackets are firmly attached to and supported by the lower shell 26.

Wheel 22 is a sturdy circular spoked wheel 22A, as on a motorcycle, with a conventional inflated rubber tire 22B and an axle 22C. Wheel 23 is identical in structure to wheel 22. The axle 22C of the left wheel is rotatably yet firmly attached to a left central bracket 131 and a left lateral wheel bracket 133.

Wheel 23 is a sturdy circular spoked wheel 23A, as on a motorcycle, with a conventional inflated rubber tire 23B and an axle 23C. Wheel 23 is identical in structure to wheel 22. The axle 23C of the right wheel is rotatably yet firmly attached to a right central bracket 132 and a right lateral wheel bracket 134.

Wheel brackets 131, 132, 133 and 134 are rigid vertically extending ell-shapes. The bottom of left wheel lateral bracket 133 is firmly fixed to the top surface of the bottom shell 26 on the lateral or left side of the wheel 22 on left lateral portion 129 of lower shell 26, laterally of left wheel hole left edge 42.

Left wheel central bracket 131 is firmly fixed to the top surface of bottom shell 26 on the central or right side of left wheel 22 on central portion 130 of shell 26 centrally of left wheel hole central edge 41.

The bottom of right lateral wheel bracket 134 is firmly fixed to the top surface of bottom shell 26 on the lateral or right side of right wheel 23 on right lateral portion 139 of wheel of lower shell 26, laterally of right wheel hole right edge 47. Right wheel central bracket 132 is firmly fixed to the top surface of bottom shell 26 on the central or left side of right wheel 23 on central portion 130 of shell 26 centrally of right wheel hole central edge 46.

The bottom shell 26 is provided with a set of three bolt holes, 27A, 27B and 27C near to its outer edges 34B. Bolts firmly attached at their top ends to the inner bottom surface of the top shell 25 thereabove pass through such holes in operative array of components of apparatus 20 and the bottom end of such bolts are held by wing nuts as 27E (for bolt passing through hole 27A) and 27F for bolt passing through hole 27B and thereby hold the upper shell and lower shell firmly yet releasably together to form assembly 21. The top shell outer edge 34T and the bottom shell edge 34B meet and form the outer circular edge 34 of the apparatus 20.

A tail wheel 24 is rotatably fixed on a tail wheel axle 24A, which axle is horizontal and held firmly between the arms of a rigid U-shaped bracket 40: bracket 40 is rotatably yet firmly attached to a sturdy cylindrical tail wheel bracket pin 45 and is rotatably about such cylindrical pin: pin 45 is firmly fixed at its top to the bottom of lower shell 26, as by welding.

The apparatus 20 is supported on wheels 22, 23 and 24: the center of gravity of the apparatus 20 is located between the line of contact 152-153 of wheels 22 and 23 with the ground and the point or zone of contact of the tail wheel 24 and the ground.

The axles of wheels 22 and 23 are located on a line about 3 inches forward of a major diameter of the edge 34.

A seat assembly 60 is firmly attached to and supported on the lower shell with its front end to the rear of wheel axles 22C and 23C. Left control arm handle 116 and right control arm handle 126 are located within outline of seat hole 33 in front of the seat assembly 60.

The seat assembly 60 shown in FIGS. 2 and 5 comprises a vertically extending back 62, frame 63 and seat 61.

The frame comprises a pair of vertically extending rigid left and right steel straps, 63' and 63'', respectively, a pair of longitudinally extending left and right base straps 163 and 163', respectively, and a pair of left and right bases 164 and 164', respectively. The bases 164 and 164' are sturdy steel ells firmly fixed to the rear portion 136 of the lower shell 26. The bottom of the vertical straps 63' and 63'' are firmly fixed to the bases 164 and 164', respectively, and extend upwardly therefrom. The straps 163 and 163' are rigid L-shaped members each an upside down "L" and each firmly fixed at its rear to a base, as 164 and 164', respectively, and extends longitudinally forward thereof and is fixed at its bottom forward end as 165' for strap 163' (165'' for 163) to the shell 26 top surface as shown in FIGS. 5 and 6. Seat back 62 is composes of a rigid flat metal plate extending between and firmly fixed to the upper ends of arms 63' and 63'' and covered by a firm cushion.

The seat 61 if formed of a rigid flat plate extending between and firmly attached to the horizontally and forwardly extending portions of straps 163 and 163' and is covered by a firm cushion. The operator 30 sits on the cushion of seat 61 and his back is supported by the seat back 62. The steering and braking control arm assembly 37 is composed of right and left control arms 28 and 29 that are pivotally supported on the bottom shell 26 and operatively connected to the wheel drive frame 73 of the drive unit 71. The control arms 28 and 29 of the control arm assembly 37 are in part within periphery of the seat hole 33 and project upwardly thereof as shown in FIG. 1 for manipulation thereof by the operator 30 as shown in FIG. 3.

An operator 30 sets on a seat assembly 60 within the outlines of upper shell seat hole 33 and, in operation of the apparatus 20, manipulates the control arms 28 and 29 of steering assembly 37.

The drive unit 71 is composed of a three-horsepower gasoline engine motor 72, a movable wheel drive frame 73 and fixed base frame 74. Base frame 74 and the motor are fixedly supported on the lower shell 25: the wheel drive frame 73 is movably supported on fixed base frame 74.

The fixed frame or base frame 74 comprises a group of four cooperating similar spaced apart rigid platforms. The fixed base frame 74 is composed of a rigid flat topped left front frame platform element 101, a rigid left rear platform element 103 which is a front-to-rear mirror image of the element 101, a rigid flat topped right front frame platform element 102 which is a left-to-right mirror image of element 101, and a right rear frame platform element 104 which is a left-to-right mirror image of element 102. The bottom of each of elements 101, 102, 103 and 104 is firmly fixed to the lower shell and each, as 101, has a flat top surface, as 110, for movable support of one of the several spaced apart portions of the movable wheel drive frame 73. Each such platform, as 101, also has a restraining means (as hook 106 on platform member 101) for preventing excessive upward and sideways movement of the wheel drive frame thereon.

Each base frame platform as 101 comprises a rigid longitudinally and vertically extending base plate 100 firmly attached at its bottom to and supported by shell 26, and a rigid horizontally extending and longitudinally extending platform 105 firmly attached to and supported by the top of base plate 100. Platform 101 has a rectangular top flat surface 110; elements 102, 103 and 104 each have identical size and rectangularly shaped flat top surfaces, 102A, 103A and 104A.

The surfaces 102A, 103A, 104A and 110 all lie in the same flat plane which in the operative position of parts of vehicle apparatus 20, as shown in FIGS. 1–5, 7, 8 and 9 is horizontal and parallel to the circular peripheral edge 34 of shells 26 and 25.

The left fixed frame front end platform 101 and the fixed frame left rear end platform element 103 are each separately firmly fixed to the top surface of bottom shell 26 along a straight line which extends parallel to the length of the shell 26. The fixed frame right front end platform element 102 and a fixed frame right front platform element 104 are each firmly fixed to top surface of the bottom of shell 26 along a straight line parallel to the line of elements 101 and 103.

The left and right edges of rectangular platform surfaces 110, 103A, 104A and 102A are parallel to each other and the left edges of surface 110 and 103A lie on one same straight line and the right edges of surfaces 102A and 104A lie on another same straight line, parallel to said one same line.

The movable wheel drive frame 73 comprises a rear drive shaft 76, front drive shaft 77, left side journal beam 78 and right side journal beam 79 in cooperative combination. The journal beams 78 and 79 are each rigid straight sturdy steel channel-sectioned beams that extend longitudinally of shell 26: beam 78 extends from top platform surface 103A of rear left fixed frame platform element 103 to top surface 110 of front left fixed frame platform element 101 and is slidably supported thereon. Beam 79 extends from and is slidably supported on top surface 102A of fixed frame right front platform element 102 to and is slidably supported on the top surface of fixed frame right rear platform element 104.

A front left bearing journal 88 and a rear left bearing journal 98 are firmly fixed to the top of left journal beam 78 near to but spaced away from the front and rear ends thereof; a front right bearing journal 89 and a rear right bearing journal 99 are firmly fixed to the top of right journal beam 79 near to but spaced away from the front and rear ends thereof.

A left handle slave sleeve 115 is firmly attached to the bottom of left journal beam 78 between left fixed frame platform elements 101 and 103: a right handle slave sleeve 125 is firmly attached to the bottom of right journal beam 79 between right fixed frame platform elements 102 and 104. These sleeves provide for manipulation of the wheel drive frame 73 as hereinbelow described and especially as described in relation to description of operations shown in FIGS. 7, 8, 9, 10, 11, 12, 13 and 14.

A front drive shaft axle 77 is a rigid cylindrical steel shaft that extends from and through and beyond and is rotatably yet firmly supported in left front journal 88 and right front journal 89. A front drive shaft cylindrical left end portion 91 extends leftwards of the front left journal 88 and a front drive shaft cylindrical right end portion 92 extends to the right of right front journal 89. A rear drive shaft 76 is a rigid cylindrical steel shaft that extends from and through and beyond and is rotatably yet firmly supported in left rear journal 98 and right rear journal 99. A rear drive shaft left end portion 93 extends leftwards of the rear left journal 98 and a rear drive shaft cylindrical right end portion 94 extends to the right of right rear journal 99. Rear drive shaft 76 passes under the frame of seat 61. The front drive shaft 76 is located under a transversely extending rigid front axle shield 75 which is supported on beam members 78 and 79. Shield 75 is L-shaped in transverse section with the "L" upside down, and its horizontal portion 75H above the shaft 77 and the vertical portion 75V slightly (¼ inch) to the rear of the front drive shaft 77.

The frame 73 accordingly rests on the top platform surfaces 102A, 103A, 104A and 110. The drive shaft ends 92 and 94 extend rightward to the right side of the tire on wheel 23, as shown pictorially in FIGS. 2 and 9, and drive shaft ends 91 and 93 extend leftward to the left side of the tire of wheel 22 as shown pictorially in FIGS. 2, 7 and 8. Shafts 76 and 77 operatively and firmly contact wheels 22 and 23 as shown pictorially in FIGS. 7 and 8 and 9 and diagrammatically in FIGS. 11–14 in operation of vehicle apparatus 20, but not in neutral position.

A rigid L-shaped right front end hook 107 is firmly fixed at its lower outer end to the vertical plate of fixed frame right front end member 102 and extends upward from the outer side of right front fixed frame member 102 and centrally over the platform surface 102A and front end 79F of right side beam member 79 in freely slidable contact therewith, as shown in FIG. 5.

A rigid L-shaped right rear end hook 109 is firmly fixed at its lower outer end to the vertical plate of fixed frame right rear end member 104 and extends upward from the outer side of right rear fixed frame member 104 and centrally over the platform surface 104A and rear end 79R of right side beam member 79 in freely slidable contact therewith, as shown in FIG. 9.

Figure 7:
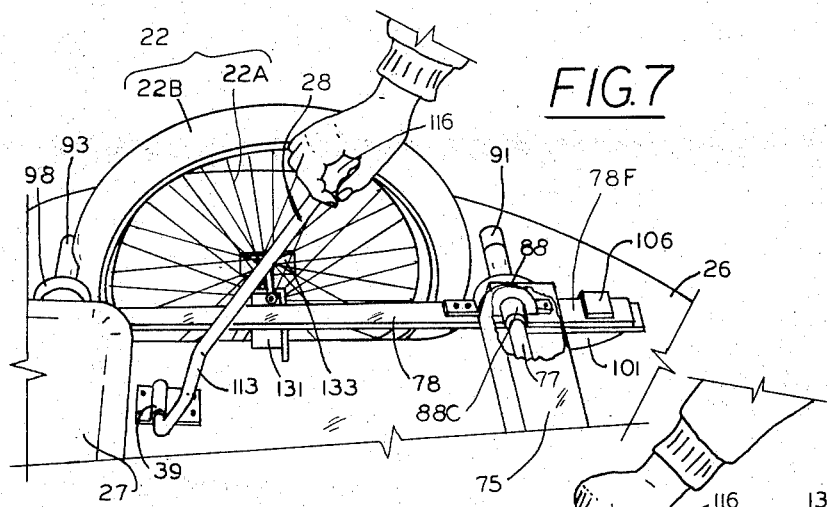
FIG. 7 is a pictorial top oblique interior view of the left wheel 22 and left steering control assembly arm 28 and related parts shown in zone 7A of FIG. 5 on movement of control arm 28 to its advanced or forward position; a portion of this view is broken away in zone 7B of FIG. 8 to show structure below shield 75.

A rigid L-shaped front end hook 106 is firmly fixed at its lower outer end to the vertical plate of fixed frame left front end member 101 and extends upward from the outer side of left front fixed frame member 101 and centrally over the platform surface 110 and front end 78F of left side beam member 79 and in freely slidable contact therewith, as shown in FIG. 7.

A rigid L-shaped rear end hook 108 is firmly fixed at its lower outer end to the vertical plate of fixed frame left rear end member 103 and extends upward from the outer side of left rear fixed frame member 103 and centrally over the platform surface 103A and rear end 78R of left side beam member 79 and in freely slidable contact therewith, as shown in FIG. 4.

The control and steering assembly 37 comprises a left control arm 28 and a right control arm 29 and their brackets. The left control arm 28 has the general shape of an upside down capital letter "F" and is a crank arm formed of a series of firmly connected elongated rigid elements 111, 112, 113, 114, 115 and 116 rigidly joined to each other and formed of steel rod and pivotally supported on shell 26 whereby movement of one, handle, end thereof (116) provides reliable and predictable movement of its branch slave arm 112. Left control arm 28 comprises an upper straight vertically extending central upper arm 111 with a handle 116 at its top and firmly connected at its bottom to the top of the lower central arm portion 113, also vertically extending, and to the central portion of a straight laterally and horizontally extending branch arm 112. The left lateral branch arm 112 fits into and pivots within a left beam sleeve 115. Left journal beam sleeve 115 is firmly attached on its top to the left side wheel drive frame journal beam member 78. The lower arm portion 113 is firmly connected to the center end of horizontally extending base pivot arm 114. Arm 114 is connected pivotally in a fixed, base sleeve 39, the outer surface of which is firmly supported on and attached to left control arm bracket 38 which bracket is firmly fixed to the top surface of the lower shell 26. Arms 111 and 112 are parallel and horizontal. FIG. 6 is a diagrammatic representation of the spatial relations and connections of the elements of arms 28 and 29.

The right control arm 29 is a crank composed of a series of rigid crank arm elements 121–124 and 126 each formed of a steel rod and rigidly connected in series and pivotally supported on shell 26 whereby movement of the handle end thereof, 126, provides reliable and predictable movement of its slave end arm 124. Right control arm 29 comprises a straight central vertically extending crank arm 121 formed of a rigid steel rod end with a handle 126 at its upper end and, its lower end, is continuous and integral with a central horizontal lower right crank arm 122 which extends straight horizontally and laterally and is also formed of a straight steel rod; arm 122 at its lateral end is continuous with and integral with a vertically extending straight right lateral vertical crank arm 123; arm 123 at its upper end is continuous with and integral with a transversely and horizontally extending straight right lateral horizontal crank arm 124. Crank arm 124 is pivotally connected to and located in the cylindrical chamber of sleeve 125. The exterior surface of sleeve 125 is operatively and firmly connected to the bottom right side wheel drive frame journal beam 79.

The central right horizontal crank arm 122 is pivotally held in (a) the sleeve 128 of the right central bracket 127 which bracket (127) is firmly connected to the top of bottom shell 26; and, also, (b) in the sleeve 138 which sleeve (138) is firmly connected to a right lateral bracket plate 137 which plate 137 is in turn firmly fixed to the upper or interior surface of portion 130 of the curved lower shell 26 immediately central of the central edge 46 of right wheel hole 36. Sleeves 128 and 138 are co-axial.

The motor 72 is a three horsepower manually started (by a standard starter cord 87) internal combustion gasoline engine of the type used for gasoline powered lawn mowers, as Briggs and Stratton 3 Horsepower as listed in Sears Roebuck Catalogue, Summer 1971, Dallas, Texas, page 1215, No. 32A-30015C, with 2⅜ inches diameter bore and 1¾ inches stroke and 7.75 cubic inch displacement, 3600 r.p.m. The motor output shaft drives a pulley and belt train comprising, in operative series combination, a motor output pulley 81, primary belt 82, rear shaft driven pulley 83, rear shaft drive pulley 84, secondary belt 85 and front axle-drive pulley 86. The motor output pulley 81 is firmly and operatively connected to the output shaft of the engine 71 and is a conventional spring loaded pulley the opposite faces of which (81A and 81B) are spring loaded to provide a substantially and relatively constant output torque; belt 82 is a standard V-belt and is operatively connected to and driven by pulley 81. Pulley 83 is a circular rigid pulley wheel and firmly fixed to and supported on the rear drive shaft 76 and co-axial therewith and operatively connected to and driven by the belt 82. Pulley 84 is a circular pulley wheel that is firmly fixed to shaft 76 adjacent to pulley 83 and journal 99 and driven by shaft 76. Belt 85 is a V-belt supported on and driven by pulley 84. Pulley 86 is a circular pulley of the same size as pulley 84; pulley 86 is supported on and firmly fixed to front drive shaft 77 adjacent to bearing 89 and is operatively connected to and driven by belt 85. Belt 85 is formed into a figure 8; thereby the shafts 77 and 76 are driven to rotate in opposing directions by the gasoline motor or engine 72 and the train of pulleys and belts 81 through 86. A collar 88C is firmly located on front shaft 77 adjacent to and central of journal 88; a collar 98C is firmly located on rear shaft 76 adjacent to and central of journal 98.

The speed of motor 72 is adjusted by manipulation of a foot pedal 70. Foot pedal 70 is a rigid longitudinally elongated flat beam which is pivotally attached at its rear end to the top surface of the bottom shell 26 below the front drive shaft 77 and spring loaded at its front to remain in elevated yet movable position. The front end of the pedal extends upwards as well as forward at an angle in excess of 45° to the horizontal, as is shown in FIGS. 4 and 5. The front end of the pedal 70 is operatively connected by a rigid throttle control rod 80 to the engine 72; this rod controls the rate of flow of fuel through the carburetor 118 of engine 72 from fuel tank to combustion chamber of the engine or motor 72 in conventional manner. Accordingly, manipulation of the pedal 70 controls the power output of the motor 72 to the pulley 81 and through the train of pulley and belt elements 81 through 86 to the drive shafts 76 and 77 and so permits ready control of the speed of drive shafts 76 and 77 for application to one or both of wheels 22 and 23.

As shown in FIG. 5 the distance between the most proximate portion of surface of drive shaft end 94 and 92 is greater than the distance across the wheel 23 by about one-half inch as measured in the direction of a line between the centers of each of those shaft ends using wheels of about 20 inches diameter, in neutral position, whereupon the distance between the most proximate portion of surface of drive shaft end 91 and 93 is greater than the distance across the wheel 22 by about one-half inch as measured in the direction of a line between the centers of each of those shaft ends of the embodiment tabulated in Table I herein.

The firm yet rotatable attachment of the axles of wheels 22 and 23 to the bottom shell 26 and the rigidity of the shell provide for no variation of such clearance between the tires and the drive shaft surfaces notwithstanding all usual stresses applied to the shell 26, in such neutral position.

The handles 28 and 29 are shown in their neutral position in FIGS. 4 and 5. Through the connection of left branch crank arm 112 of arm 28 and right lateral crank arm 124 of arm 29, respectively, to sleeves 115 and 125 of left and right journal beam members 78 and 79, respectively, manipulation of handles 116 and 126 maintains the axle ends 91, 92, 93 and 94 close to; i.e., within one-fourth inch of but out of operative contact with the radial surfaces of the tires of wheels 22 and 23, as shown in FIGS. 4 and 5. Such relations are of the neutral position of wheel drive frame 73 are also shown diagrammatically in FIG. 10.

Movement of the handle 116 forward of its neutral position as shown in FIG. 7 with corresponding changes in position of frame 73 shown in FIGS. 7, 12 and 13 brings the left rear drive shaft end 93 into driving contact with the tire of wheel 22 while moving the front drive shaft left end 91 further from mechanical contact with front end of tire of wheel 22 then in the neutral position of frame 73 as FIGS. 4, 5 and 10 show.

Movement of the handle 126 forward of its neutral position as shown in FIG. 9 with corresponding changes in position of frame 73 shown in FIGS. 9, 12 and 14 brings the right rear drive shaft end 94 into driving contact with the wheel 22 while moving the front drive shaft right end 92 correspondingly further from contact with wheel 22 then in the neutral position of frame 73 in FIGS. 4, 5 and 10.

Movement of the left control arm handle 116 rearwards of its neutral position as shown in FIG. 8 with corresponding changes in position of frame 73 shown in FIGS. 8, 11 and 14 brings the left front drive shaft end 91 into driving contact with the tire of wheel 22 while moving the rear drive shaft left end 93 further out from mechanical contact with wheel 22 than in the neutral position of frame 73 in FIGS. 4, 5 and 10.

Movement of the left control arm handle 126 rearward of its neutral position with corresponding changes in position of assembly 71 shown in FIGS. 11 and 13 brings the right front drive shaft end 92 into driving contact with tire of wheel 23 while moving the rear drive shaft right end 94 further from contact with tire of wheel 22 then in the neutral position of frame 73 shown in FIGS. 4, 5 and 10.

The right front platform 102 of the fixed frame supports a retaining hook 107 which hook extends over the top of the wheel drive frame right side beam 79F as shown in FIGS. 5 and 11 and a right rear fixed frame hook member 109 attached to member 102 as 107 is to member 102 extends over the rear end 79R of the wheel drive frame right side beam member 79 as shown in FIGS. 9 and 12.

A left front platform of the fixed frame supports a hook 106 which hook extends over the top of the wheel drive frame left side beam 78F as shown in FIGS. 4, 7, 11 and a left rear fixed frame hook member 108 attached to member 103 as 106 is to member 101 extends over the rear end 78R of wheel drive frame left side beam member 78 as shown in FIGS. 4 and 12.

These hook members provide no interference with the above described movements of the wheel drive frame 73 to and from the different positions thereof diagrammatically shown in FIGS. 10 through 14 while, in cooperation with the central location (on shaft 76) of collar 98C to journal 98 and pulley 84 to journal 99, and (on shaft 77) of collar 88C to journal 88 and pulley 86 to journal 89 preventing the ends of the frame 73 from losing supporting contact with the platform surfaces 110, 102A, 103A and 104A, respectively of fixed base frame 74 in any of those positions shown in FIGS. 10-14.

The platforms 101, 102, 103 and 104 are shown as wider in diagrammatic FIGS. 13 and 14 than in FIGS. 10, 11 and 12 for purpose of illustration only in view of the exaggerated angular displacement of the frame 73 provided in FIGS. 13 and 14 for illustrative purpose.

The description in paragraphs (c) and (d) below are descriptions of operation for turning vehicle apparatus 20 about a vertical axis located at the center of the circular shell edge 34 when the angular and linear speeds of wheels 23 and 22 are equal. When the speeds of wheels 22 and 23 are not equal the rotation of vehicle apparatus does not occur about such central axis; however, the control arms 28 and 29 are so readily controlled as above described that the wheels 22 and 23 are not only readily controllably driven at equal and opposite angular and linear velocities for turning the apparatus 20 clockwise or counterclockwise about the center of the shell 25, as described at paragraph (c) and (d) below, and shown in FIGS.13 and 14, but also the wheels 22 and 23 may be readily and controllably driven at equal and similarly directed parallel velocities for driving the vehicle apparatus forward or backwards in straight lines as illustrated in FIGS. 11 and 12 and described in paragraphs (a) and (b); and further, as below described at paragraphs (e) and (f) the vehicle may be driven in paths of any intermediate curvature between the straight line path and rotation about center of shell 26.

The small movement of arm 112 and 124 on large motion of the handles 116 and 126 is adequate for close control of the position of shaft ends 91, 92, 93 and 94 because of the dimensional stability of shell 26: such dimensional stability permits a small amount of displacement of shaft ends 91-94 to create different movements of the apparatus 20 herein described and differing degrees of such movements. The small displacements of shaft ends for such different movements does not affect the tension in belt 82 as the spring loaded pulley 81 and belt 82 are entirely able to accommodate to such change in pulley 81 to pulley 83 distance (one-half inch in the particular embodiment herein described). The ball and socket effect of the pivotal connection of the arms 28 and 29 of assembly 37 to the wheel drive frame 73 (in sleeves 115 and 125) and the slidable support of front and rear ends of left and right journal beam members 78 and 79 on the upper platform surfaces 110, 102A, 103A and 104A of the fixed or base frame 74 and the connection of train of pulleys and belts 81-86 provide that, on starting and running of the engine 72 in the operatively connected apparatus 20 that:

a. on concurrent movement by the operator 30 of left handle 116 and right handle 126 forward and, thereby, beam members 78 and 79 forward of the neutral positions thereof, which neutral position is shown in FIGS. 4, 5 and 10, until the wheels 22 and 23 are in driving contact with drive shaft ends 93 and 94 respectively as shown in FIGS. 7 and 9 respectively and in FIG. 12 vehicle 20 is driven in the forward direction 97 as shown in FIGS. 12 and 15, such firm engagement providing driving contact between those shaft ends and those wheels; and b. on concurrent movement by the operator 30 of left handle 116 and right handle 126 rearward and thereby beam members 78 and 79 rearward of the neutral positions thereof, which neutral position is shown in FIGS. 4, 5 and 10,until the wheels 22 and 23 are firmly engaged by front drive shaft ends 91 and 92 respectively as shown in FIGS. 8 and 11 and vehicle 20 is driven in the rearward direction 90 as shown in FIG. 11, such firm engagement of shaft ends 91 and 92 and wheels 22 and 23 providing driving contact therebetween; and c. on concurrent movement by the operator 30 of left handle 116 forward and right handle 126 rearward of their respective neutral positions and thereby resulting movement of left drive frame journal member 78 forward of its neutral position and right drive frame journal member 79 rearward of its neutral position, which neutral positions are shown in FIGS. 4, 5 and 10, until wheel 22 is firmly engaged at its rear by left rear drive shaft end 93 as shown in FIGS. 7 and 13 and right wheel 23 is firmly engaged at its front by right front drive shaft end 92 as shown in FIG. 13, vehicle 20 is driven in the clockwise direction 95 as shown in FIGS. 13, and 15; such firm engagement providing driving contact between shaft ends 93 and 92 and wheels 22 and 23, respectively; and d. on concurrent movement by the operator 30 of left handle 116 rearward and right handle 126 forward of their respective neutral positions and thereby resulting movement of left drive frame journal member 78 rearward of its neutral position and right drive frame journal member 79 forward of its neutral position, which neutral positions are shown in FIGS. 4, 5 and 10, until wheel 22 is firmly engaged at its front by front left drive shaft end 91 as shown in FIG. 14 and right wheel 23 is firmly engaged at its rear by right rear drive shaft end 94 as shown in FIG. 14, vehicle 20 is driven in the counterclockwise direction 96 as shown in FIG. 14; such firm engagement is that which produces driving contact between such ends 91 and 94 and wheels 22 and 23 respectively; and e. on movement by the operator 30 of left handle 116 forward of its neutral position until and resultant movement of left drive frame journal beam member 78 forward of its neutral position until left wheel 22 is firmly engaged at its rear by left rear drive shaft end 93 as shown in FIG. 7 while right handle 126 is maintained in its neutral position, with consequent holding of right drive frame journal beam member 79 in its neutral position, the vehicle apparatus 20 travels in a circular path in a clockwise direction as 147 from position 20G to position 20H in FIG. 15. The radius of curvature of such a path is icreased by providing power to right wheel 23 to more closely approximate the angular velocity of the wheels 23 and 22 by bringing the powered rear right drive shaft end into driving contact with tire of right wheel 23, as shown in FIG. 9, which is accomplished by moving the right handle 126 forward of its neutral position.

f. on movement by the operator 30 or right handle 126 forward of its neutral position until and resultant movement of right drive frame journal beam member 79 forward of its neutral position until right wheel 23 is firmly engaged at its rear by right rear drive shaft end 94 as shown in FIG. 9 while left handle 116 is maintained in its neutral position, with consequent holding on left drive frame journal beam member 78 in its neutral position, the vehicle apparatus 20 travels in a circular path in a counterclockwise direction, or leftwards, as seen from above. The radius of curvature of such a path is increased by providing power to left wheel 22 to more closely approximate the angular velocity of the wheels 22 and 23 by bringing the powered rear left drive shaft end into driving contact with tire of left wheel 22, as shown in FIG. 7 which is accomplished by moving the left handle 116 forward of its neutral position.

The bottom shell 26 may be bent to form a flat circular rim 26R at its outermost three-fourths inch; and it is on such an outermost circular or annular rim that holes, as 27A, 27B and 27C would be located as shown in FIG. 4. The outer edge 34A of top shell 25 would then rest on rim 26R.

The edge 34T of shell 25 and outer or lateral edge 34B of shell 26 are ground to the same lateral or outer circular edge size and shape.

In parking operation of vehicle apparatus 20 the operator 30 may, as shown in FIG. 15, drive the vehicle apparatus 20 in the forward direction 97 from a position as 20A to a position as 20B in a street, 144, parallel to parked cars, as 141 and 142, towards a parking space as 143 between the front end, 146, of the car 142 to the rear of the parking space 143 and the rear end, 145, of the car 141 in front of the space 143. The driver 30 may then advance the vehicle apparatus 20 further along direction 97 to the position 20C whereat (at position 20C) the rear of the apparatus 20 is forward of the forward end 146 of the car 142 and the rear end of the parking space 143. At such position the vehicle may be stopped from its forward motion by the following procedure:

The operator moves handles 116 and 126 backwards, as for backward motion illustrated in FIG. 11, but instead of a firm driving contact of front drive shaft ends 91 and 92 with wheels 22 and 23, there is only a light application by the operator 30, through pedal 70 and handles 116 and 126, of physical contact of the turning front drive shaft ends 91 and 92 to the front end of wheels 22 and 23 until such contact brings the vehicle 20 to a complete stop, while, however, the engine 72 continues to run. The vehicle 20 is then, at position 20C, turned clockwise, along direction 95 for a 90° turn, and then moved forward along direction 97A to position 20D and then to position 20E in the parking place 143. Thereafter the vehicle 20 is again brought to a complete stop. The ignition to the engine may then be stopped.

Vehicle 20 may, after starting the engine 72, then be rotated as above described (in explanation of FIG. 14) in the counterclockwise direction 96 for its length to be parallel to the curb 148 and then moved forward (to position 20F) to provide space for another such vehicle and later, further rotated counterclockwise about its center to face, as shown at position 20F, away from the curb and into the street. The vehicle motor is then started and, through manipulation of handles 116 and 126 as above described [at (e) hereinabove] power applied from the motor 72 through the rear drive shaft 76 preferentially to the left wheel 22 as in FIG. 7 while less forcefully to the right wheel 23, as shown in FIG. 9 and accordingly propel the vehicle apparatus 20 in a clockwise curved path, as path 147 in FIG. 15, with a center of curvature to the right of the outer shell edge 34.

Figure 16:
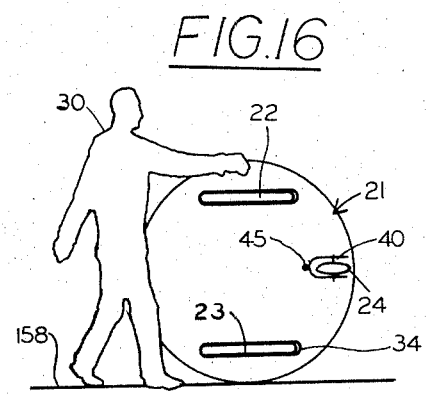
FIG. 16 illustrates a position of the vehicle apparatus 20 for movement thereof from one place to another and/or storage thereof.

Because it is formed as one integral piece and because it is curved as a substantial segment of a sphere, and so reinforced by its peripheral portions at an angle to its central portion and is also formed of strong material, although in sheet form the lower shell 26 is not only resistant to and capable of absorbing, without appreciable dimensional changes, bending stresses applied thereto to support the weight of motor and drive elements and operator in the position of parts shown in FIGS. 1 and 3, but also compression and torsion stress applied thereto during normal operation thereof including the position of parts shown in FIG. 16, when circular edge 34 is vertically extended and supports the apparatus 20.

Accordingly, the rearward thrust provided the shell 26 near left control arm bracket 38 and the forward thrust on right control arm brackets 127 and 137 during the clockwise rotation of the vehicle apparatus 20 and action of parts illustrated in FIG. 13 and the opposite thrusts on the shell through those brackets during the counterclockwise rotation and the action of parts and their position illustrated and discussed in regard to FIG. 14, do not affect the dimensional relations of the apparatus 20 parts that might occur in a less twist resistant structure. Additionally, the bending and impact stresses that develop in a traveling structure which is supported at four points (the ends of axles of the wheels 22 and 23) with a weight therebetween is very well met by the wide and slightly curved central shell area portion 130 of the shell 26 between and lateral (129,139) of holes 35 and 36 in cooperation with the portion 135 of the shell 26 to the front of the wheel holes and portion 136 to the rear of the wheel holes while the compressive stresses are also met by the portions 129 and 139 lateral of wheels 22 and 23, respectively.

The outer or edge portions of front and rear portions 135 and 136 of shell 26 are at an angle to and reinforce the central shell portion 130 and accordingly provide for its left to right dimensional stability; i.e., prevention of its bending along length of shell 26; and the left and right lateral shell portions 129 and 139 of shell 26, in cooperation with portions 135 and 136 to which firmly connected, also reinforce and provide dimensional stability to portion 130 by prevention of bending of portion 130 about an axis transverse to the length of shell 26.

The entire vehicle apparatus 20 weighs only 300 pounds empty, inclusive of shell, motor and wheels; the 3 horsepower motor 72 propels the apparatus at 20 miles an hour with ease, which is entirely adequate for most urban driving. Additionally, the small amount of exhaust provided by such motor of low horsepower is particularly desirable from an environmental point of view. The exhaust can be further treated to remove undesirable emission therein; however, the fact of such a small amount of combustion products produced by such a low horsepower motor in comparison with conventional internal combustion automotive engines of 50 to 150 horsepower and the ready parking of the vehicle apparatus 20 makes it particularly useful in and compatible with modern urban parking and driving conditions.

The apparatus 20 may be provided with a roof, as 150, supported on an extensible frame 151, as shown in FIG. 3 and apparatus 20 may also be provided with extensible back seat support cushions, as 160.

Front and rear license plates 155 and 156, respectively are firmly yet releasably attached to the upper shell 25 near the front and rear ends thereof.

The round peripheral contour of the apparatus 20 and the great strength of the shell 26 permit that the apparatus 20 be rolled, somewhat like a hoop, as shown in FIG. 16: for such operation, apparatus 20 is brought to the on-edge position shown in FIG. 16 by tipping the apparatus 20 forward, first about an axis of rotation 152-153 concurrent with and/or passing through the line of contact between wheels 22 and 23 and the ground therebelow until there is contact of the forward tip, 157 at the forward end 135 of the bottom shell 26 and the ground: thereafter, the apparatus is pivoted upward around the point of contact of the shell 26 and the ground, the point of contact of unit 21 being diametrically opposite to the location of tail wheel 24 on shell 26, until the edge 34 of shell 26 lies in a vertical plane as shown in FIG. 16.

For such transport the line from the gas tank to the carburetor is shut by a conventional plug valve therebeween and the gas tank cap used is one that has its air vent then shut off.

Such transport permits the vehicle 20 to be readily stored in garages and may even be transported in convention passenger elevators.

Roof as 150 may be folded to a collapsed position (shown in FIGS. 1 and 2) and the seat 61 also folded.

The motor 72 shown is an internal combustion engine but it is within the scope of this invention that an electric motor powered by rechargeable batteries be substituted therefor: the electric motor would be located where the internal combustion engine 72 is located and firmly attached to shell 26 and would drive the same constant torque pulley 81. The space to the rear of shaft 76 over portion 136 of the lower shell 26 and the space over portion 135 of shell 26 forward of shaft 76 would be used for battery location. The operation of vehicle apparatus 20 otherwise would be the same as described.

The vehicle apparatus 20 requires no brake steering adjustment because the manipulation by the operator of arms 28 and 29 provides for positive and accurate braking and steering, without danger of breaks in hydraulic braking or power steering lines or requirement of periodic adjustment for adequate operation.

The rounded peripheral edge 34 permits minimizing effect of what would otherwise be head-on collisions with other moving or stationary objects.

Pin 45 is located a distance ($a$) from a straight line between centers of axles 22C and 23C slightly less (dependent on horizontal distance between pin 45 and axle 24 centers) than ($b$) the center-to-center distance between those axles 22C and 23C so that ($c$) the linear distance between ($i$) the point of contact of the wheel 24 (below axle 24A) with the ground, as 158, to (ii) the center of the line of contact 152-153 of wheels 22 and 23 with the ground will be one-half of the distance from wheel 22 to wheel 23 along the line of contact 152-153 when the apparatus 20 rotates in direction 95 or 96 generally about its central axis as in FIGS. 13 and 14. In other, e.g., forward and soft turn positions of parts of apparatus 20 the distance between the point of contact of wheel 24 with the ground to the center of line of contact 152-153 of wheels 22 and 23 is greater than one-half the distance from wheel 22 to wheel 23 along line of contact 152-153.

The direction of rotation of the motor and the pulley and belt arrangement provides that rotation of the driving shaft ends 91-94 is such that the thrust on such shafts is downward against the fixed frame while such shaft ends apply rotative force against the wheels as 22 and 23.

TABLE 1: DIMENSIONS OF APPARATUS 20

| | |
|---|---|
| Height of edge 34 over ground | 11" |
| Height of bottom of shell 26 over ground (FIGS. 3, 1) | 3 ½" |
| Diameter of edge 34 | 48" |
| Outer diameter of wheels 22 and 23 (20 X 2.125 tire) | 21" |
| Width of tires of wheels 22 and 23 | 1 ¾" |
| Center-to-center distance of shaft end 91 to shaft end 92 (FIGS. 4, 15) | 22" |
| Center-to-center distance of journals 88 and 89 (and 98 and 99) | 36" |
| Distance of each of shaft ends 91 and 93 surfaces to outer surface of wheel 22 at neutral position (FIG. 4) | 0.2" |
| Distance of each of shaft ends 92 and 94 surfaces to outer surface of wheel 23 at neutral position (FIG. 5) | 0.2" |
| Thickness of wall of shells 26 and 25 | 3/16" steel |
| Maximum angle of outer surface of shell 26 to plane of edge 34 | 35° |
| Angle of portion 135 of shell 26, at junction of portions 135 and 130, to horizontal (same as angle of portion 136 at junction of portions 136 and 130) | 20° |
| Length of bracket 131 | 4" |
| Height of Bracket 131 over top of surface of shell 26 to which it is attached | 2" |
| Axis of axle 22C to top of bracket 131 | ⅝" |
| Seat hole 33, width | 20" |
| Wheel hole 36, length | 22" |
| Wheel hole 36, width | 3 ½" |

I claim:

1. An automotive operator carrying vehicle apparatus comprising:

a. a rigid frame;

b. a first ground engaging wheel and second ground engaging wheel, each independently rotatably supported on said frame on supports in fixed position on and firmly attached to said frame, and each such wheel is located within the outline of said frame; holes in said frame for said wheels, said wheels projecting downwardly through said holes and below the bottom of said frame;

c. a plurality of upwardly facing horizontally and longitudinally spaced apart horizontally extending bearing surfaces on supports firmly attached at their bottom to said frame;

d. a wheel drive frame unit comprising i. a pair of longitudinally extending beam members each extending between and each beam member movably supported on two of said longitudinally spaced apart bearing surfaces; said beam members each longitudinally movable on said two longitudinally spaced apart bearing surfaces, and ii. a plurality of transversely extending contrarotating shaft members rotatably supported in journals fixedly attached to said beam members, and portions of each of said shaft members being movable into and out of operative connection with said wheels;
e. steering means comprising a first rigid crank arm pivotally fixed near one end thereof to said frame and comprising a transversely extending arm that pivotally engages one longitudinally extending beam member and a second rigid crank arm pivotally fixed near one end thereof to said frame and comprising a transversely extending arm that pivotally engages another longitudinally extending beam member; and
f. mechanical power means operatively connected within the outline of said frame to said transversely extending contrarotating shaft members, and said power means fixedly supported on and attached to said frame;
g. said steering means operable to move any one of said transversely extending contrarotating shaft members into and out of operative connection with one of said wheels while said transversely extending shaft members and said power means are operatively connected;
h. operator seating means firmly attached to said frame in operative proximity to said steering means.

2. Apparatus as in claim 1 wherein said shaft members are located on opposite sides of each of said wheels.

3. Apparatus as in claim 2 wherein each of said steering means crank arms also includes a vertically extending handle means extending above its transversely extending arm.

4. Apparatus as in claim 2 wherein the frame comprises central portions and peripheral portions and said central portions and peripheral portions are continuous with each other and boundaries of the peripheral portions are located in rectilinear surfaces at an angle to the plane of the rectilinear surface in which the boundary of the central portion lies.

5. Apparatus as in claim 2 wherein the frame comprises a pair of joined like rigid shell portions, each of which shell portions is an integral metal sheet shaped in the form of a hollow spherical segment with a circular edge.

6. Apparatus as in claim 5 wherein said ground engaging wheels are rotatably supported on axles firmly and rotatably supported in fixed position on said frame and are each located with an axis of rotation normal to a vertical plane including a diameter of the circular edge of said frame.

7. Apparatus as in claim 6 wherein a third wheel is rotatably attached for rotation about an axis thereof to an outer surface of one spherical segment of said shell portion and the center of gravity of said vehicle apparatus lies between said axis of rotation of said first and second wheels and the axis of rotation of said third wheel.

8. Apparatus as in claim 2 wherein firm restraining means, each comprising vertically and horizontally extending arms, are attached to each of said bearing surface supports and the horizontal arm thereof extends above a portion of a longitudinally extending beam member movably supported on said bearing surface and the vertical extending arm thereof is firmly attached to one side of said support.

* * * * *